No. 829,765. PATENTED AUG. 28, 1906.
F. R. CARPENTER.
PROCESS OF RECOVERING SULFUROUS OXID.
APPLICATION FILED JUNE 19, 1905.
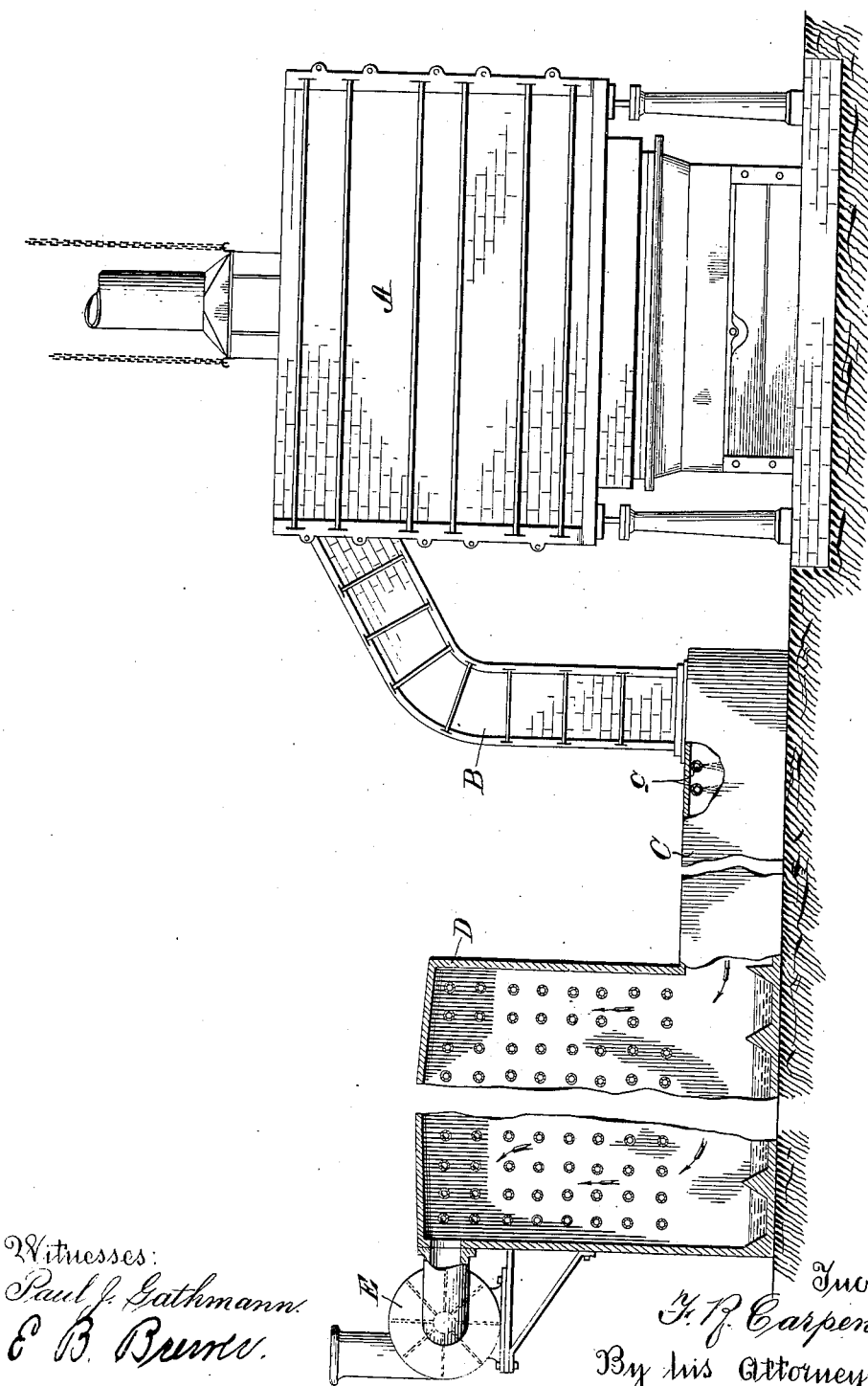

UNITED STATES PATENT OFFICE.

FRANKLIN R. CARPENTER, OF DENVER, COLORADO.

PROCESS OF RECOVERING SULFUROUS OXID.

No. 829,765.      Specification of Letters Patent.      Patented Aug. 28, 1906.

Application filed June 19, 1905. Serial No. 266,050.

*To all whom it may concern:*

Be it known that I, FRANKLIN R. CARPENTER, a citizen of the United States, residing in Denver, in the county of Denver and State of Colorado, have invented certain new and useful Improvements in Processes of Recovering Sulfurous Oxid from Furnace-Gases, of which the following is a specification.

In calcining and smelting sulfid ores there are contained in the gases given off by the furnaces large quantities of sulfurous oxid, ($SO_2$.) The usual practice is to discharge such furnace-gases into the atmosphere, with the result that all vegetation in the surrounding country is destroyed. The presence of this gas in the atmosphere is also injurious to animal life in the region in which the furnace is located.

The principal objects of my invention are, first, to prevent the discharge of this injurious gas into the atmosphere, and, second, to collect and concentrate it for further use, either for the purpose of obtaining sulfur therefrom or further treating it to produce sulfuric acid, or for other purposes in which sulfur or its compounds are employed in the arts.

It is well known that the gases from metallurgical furnaces contain metallic particles and vapors which pass off with the furnace-gases, and incidentally my invention provides for the collection of such metallic particles in solid form and to allow only such gases as nitrogen, carbonic oxid, and other harmless gases which may be present to escape; but my process is conducted with special reference to separating from the furnace-gases sulfurous oxid and concentrating it in such manner that it may be further treated with facility for the manufacture of sulfur, sulfurous acid, or sulfuric acid.

In carrying out my process the furnace-gases are first conducted through a flue of considerable length and size in which dust or solid particles mechanically carried over will be largely deposited and collected. This flue being of considerable size and length will also serve to reduce the temperature of the gases as they pass through it approximately to the temperature of the atmosphere, and to aid in the cooling of the gases I preferably spray water into the flue at any desired point or points, and this also serves to moisten the gases and facilitate the refrigeration, absorption, and deposit of sulfurous oxid in the further treatment of the gases which pass from the flue to a refrigerating-chamber in which the gases are brought into contact with surfaces maintained at a low temperature by the circulation of brine, ammonia, sulfurous oxid, or other refrigerant. In this chamber the temperature of the gases is reduced to approximately 0° centigrade, and the sulfurous oxid contained in the gases is largely absorbed by the watery vapor, and as the watery vapor is congealed it will entrap the sulfurous oxid, and thus separate it from the fixed gases. The metallic vapors in the gases are also condensed; but this feature of the process need not be especially considered, as it is only incidental to the main purpose of my invention, which is the recovery of sulfurous oxid, and the process is conducted with especial reference to such recovery. The cooling of the gases is gradual and before they are cooled down to approximately 0° centigrade most of the sulfurous oxid will be absorbed. If the cooling of the gases be continued until their temperature is lowered to minus 10° centigrade, practically all of the sulfurous oxid will be separated, some of it being reduced to a liquid.

While the furnace-gases naturally contain aqueous vapor, I prefer to add water by spraying it in the flue, as before stated, in order to more thoroughly moisten the gases and facilitate the absorption of the sulfurous oxid in the refrigerating-chamber.

Wherever in the above description I have referred to sulfurous oxid ($SO_2$,) I also intend to include sulfuric oxid, ($SO_3$,) which is usually present in variable quantities in the furnace-gases. Both of these gases in the presence of water combine with it and form, respectively, sulfurous acid and sulfuric acid.

In the accompanying drawing I have shown, partly in elevation and partly in section, an apparatus which will indicate what devices may be used in carrying out my process.

A represents a metallurgical furnace from which a downtake B conducts the furnace-gases to the flue C, which should be of sufficient size and length to permit the larger solid particles mechanically carried over with the gases to settle as far as possible, while the gases are cooled down to approximately the temperature of the atmosphere. By thus depositing the solid particles I am enabled to obtain a purer and cleaner product in the refrigerating-chamber, where the sulfurous oxid is collected. The flue C is preferably provided with one or more water-sprays, as indicated at c, for the purpose of obtaining a complete saturation of the gases with watery vapor while passing to the refrigerating-chamber D, which is of considerable size and length, built with walls of low conductivity and is provided throughout its length with connected transverse pipes, through which a refrigerating liquid is caused to circulate. The drawing shows the refrigerating-chamber D broken away in order to indicate that only part of this chamber is illustrated, it being, as before stated, of considerable length in order that the gases may be gradually cooled and the sulfurous oxid completely absorbed before any of the gases are allowed to escape. The bottom of the chamber may be formed, as shown, with channels by which the products may be drained off or removed to one side.

At the end of the refrigerating-chamber D opposite that connected with the flue C is located an exhaust-fan E, which will aid the passage of the gases through the chamber and cause the discharge of what has been called the "fixed" gases. The furnace-gases preferably enter the refrigerating-chamber completely saturated with moisture, which immediately begins to condense and will precipitate like rain to the floor of the chamber and will be deposited like frost on the pipes. Solid particles in suspension in the gases, whether they come as such from the furnace or whether formed by solidification of metal vapors, will form centers for the condensation of the moisture and will also be caught mechanically by the moisture when condensed and by both means will be separated from the gases and precipitated. As the gases pass farther into the chamber their temperature is further lowered and the remaining moisture will tend to congeal. Under these conditions also any solid particles in the gases will form centers of crystallization and in that way and also mechanically will be enmeshed by the congealed moisture, and thus be separated by precipitation. The watery vapor contained in the gases also acts progressively on the contained vapors capable of combination with or solution in water. The watery vapor beginning to condense on entering the refrigerating-chamber will at once absorb the sulfurous and sulfuric oxids with which it is in contact, thereby forming sulfurous and sulfuric acids, and the power of absorption increases as the temperature is lowered toward the point at which the sulfurous and sulfuric oxids will themselves liquefy, so that as the gases approach the discharge-opening of the refrigerating-chamber they will be completely absorbed by the condensed water and only those gases will remain as such which are unaffected by any ordinary low temperature and which are harmless to life and vegetation.

As before stated, my process is conducted with special reference to the recovery of sulfurous oxid from furnace-gases, and while it is true that metallic particles and some other things are also collected, this is merely incident to my process, and my process is not conducted with special reference to the recovery of anything except sulfurous oxid or sulfuric oxid, which latter is usually present. The sulfurous oxid is absorbed by the water, and this water containing the sulfurous oxid may be further treated to produce sulfuric acid by the contact of other processes, or it may be treated by well-known processes to obtain sulfur in solid form.

In the well-known contact-sulfuric-acid process the dust often present in the gases interferes greatly with the operation, and it is expensive to heat up the inert gases which usually pass to the catalyzing substances. By my improvements the dust and inert gases are eliminated, and thus when the sulfur-gases, cleaned and concentrated by my process, are used in the contact process the cost of such process is greatly reduced. Again, it is not usually considered profitable to use the fumes from pyrrholite for the manufacture of sulfuric acid, although pyrrholite exists in great quantities throughout the whole Appalachian region, while pyrite is scarce. By my improvements the useless gases present in such pyrrholite fumes are eliminated and only rich sulfurous oxid gases are collected, which may thus be allowed to pass to the lead-chambers or the catalyzers and used with economy.

What I claim is—

1. The herein-described process of separating sulfurous oxid from furnace-gases, which consists in first separating from the furnace-gases dust or solid particles mechanically carried over from the furnace, refrigerating the gases thus cleaned to approximately 0° centigrade to cause the sulfurous oxid contained in the gases to be absorbed by the watery vapor therein and to be condensed or concentrated and deposited, separating the sulfurous oxid from the fixed gases and carrying off the fixed gases thus separated.

2. The process herein described, consisting in gradually cooling the gases of furnaces burning sulfid ores, depositing solid particles mechanically carried over with the gases while they are being cooled, separating sulfurous oxid from the fixed gases by absorbing it in water and refrigerating it, carrying away the unabsorbed or fixed gases thus separated from the sulfurous oxid and then collecting the sulfurous oxid thus separated and concentrated.

3. The process herein described, which consists in gradually cooling the gases of furnaces burning sulfid ores, moistening said gases with cold water, depositing solid particles mechanically carried over with the gases while they are being cooled and moistened, separating sulfurous oxid from the fixed gases by absorbing it in water and refrigerating it, carrying off the unabsorbed or fixed gases thus separated and then collecting the sulfurous oxid thus concentrated and separated from the fixed gases.

In testimony whereof I affix my signature in presence of two witnesses.

FRANKLIN R. CARPENTER.

Witnesses:
CRANSTON HOWE CARPENTER,
FRANK L. GRANT.